Aug. 28, 1923.
J S. KINNEY
COMPOSITE STEERING WHEEL
Filed Dec. 14, 1918
1,466,235
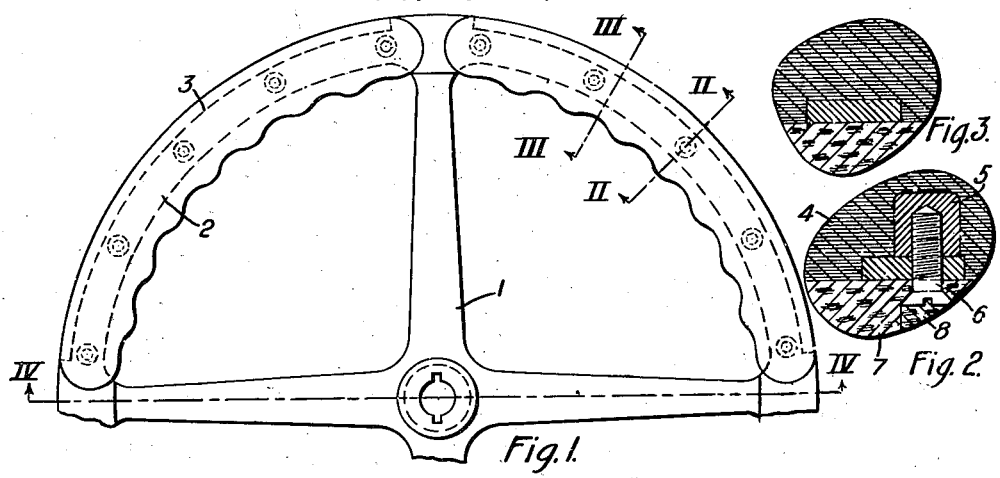
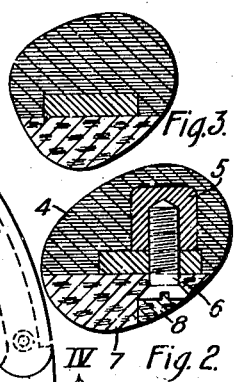
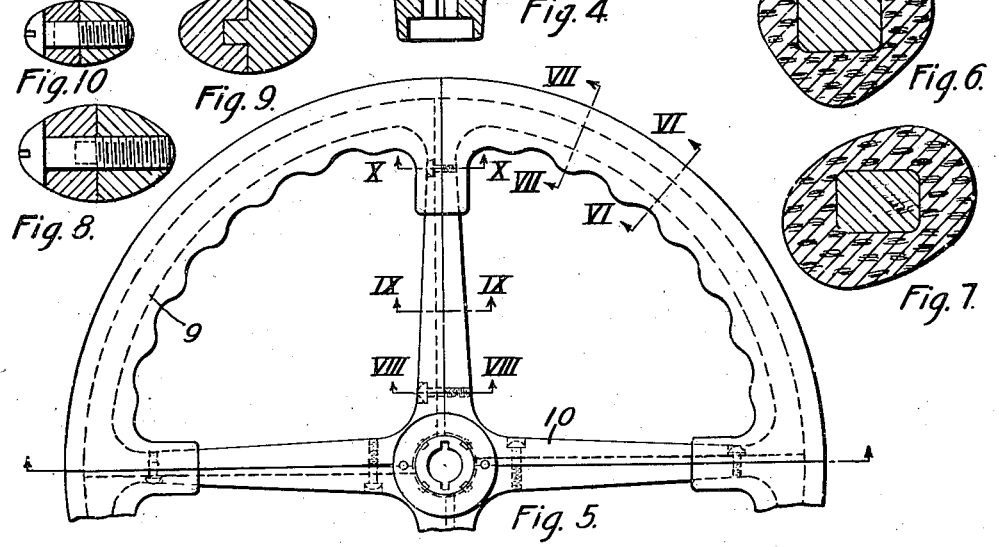
WITNESSES:
H.T. Shelhamer
O.E. Bee.
INVENTOR
J. Stanley Kinney
BY
Wesley G. Carr
ATTORNEY Patented Aug. 28, 1923.

1,466,235

UNITED STATES PATENT OFFICE.

J STANLEY KINNEY, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE STEERING WHEEL.

Application filed December 14, 1918. Serial No. 266,735.

*To all whom it may concern:*

Be it known that I, J STANLEY KINNEY, a citizen of the United States, and a resident of Wilkinsburg, in the county of Allegheny and State of Pennsylvania, have invented a new and useful Improvement in Composite Steering Wheels, of which the following is a specification.

My invention relates to steering wheels for vehicles and more particularly to that part of the wheel constituting the gripping member. The primary object of my invention is to provide gripping members for steering wheels of such character that they shall be exceptionally durable in service and pre-possessing in appearance.

One object of my invention is to provide gripping members for steering wheels by employing a comminuted material, such as cork, which has a high coefficient of friction and uniting it with a binder which, when subjected to heat and pressure, forms a hard and unitary body.

Another object of my invention is to provide steering wheels with gripping members which shall be unaffected by moisture, wide temperature changes, oils and weak acids.

A still further object of my invention is to provide gripping members for steering wheels which may be applied to steering-wheels frames of any type and which may be of such composition that the finished article will add to, rather than detract from, the appearance of a vehicle, as a whole.

With these and other objects in view, my invention will be more fully described, illustrated in the drawings, in the several views of which corresponding numerals indicate like parts, and then particularly pointed out in the appended claims.

In the drawings, Fig. 1 is a plan view, parts being broken away, of a steering wheel constructed in accordance with my invention; Fig. 2 is a cross sectional view, on a larger scale, taken along the lien II—II of Fig. 1; Fig. 3 is a similar cross sectional view taken along the line III—III of Fig. 1; Fig. 4 is a diametral sectional view of the steering wheel shown in Fig. 1; Fig. 5 is a plan view, parts being broken away, of another type of steering wheel to which my invention may be applied; Fig. 6 is a cross sectional view, on a larger scale, taken along the line VI—VI of Fig. 5; Fig. 7 is a similar cross sectional view taken along the line VII—VII of Fig. 5; Fig. 8 is a cross sectional view taken along the line VIII—VIII of Fig. 5; Fig. 9 is a cross sectional view taken along the line IX—IX of Fig. 5; Fig. 10 is another cross sectional view taken along the line X—X of Fig. 5 and Fig. 11 is a diametral sectional view of the steering wheel shown in Fig. 5.

I may provide a steering wheel with a gripping member or a covering disposed upon the periphery of the steering-wheel frame, in accordance with my invention, by employing a molding composition comprising a comminuted material having a high coefficient of friction such, for example, as cork and a finely divided material, such as wood flour, together with a binder, such as a phenolic condensation product. The proportions in which the materials, above designated, are employed depend, to a great extent, upon the nature of the gripping member desired. For example, if a decorative finish is desired, the gripping member is preferably constructed in such manenr that the material having a high coefficient of friction is concentrated in that part of the gripping member the least exposed to view and the outer or more conspicuous portion of the gripping member may be formed of a composition which, when molded, presents a decorative surface. The ultimate composition employed is, in each instance, essentially the same, the ingredients being varied in proportion to attain the required result.

A gripping member may be provided for a steering wheel, in accordance with my invention, by impregnating ground cork with a binder, such as a phenolic condensation product. The cork may be impregnated by placing a desired quantity in a standard mixing machine with a suitable amount of a phenolic condensation product in a liquid form and thoroughly mixing the two. A finely divided material, such as wood flour, may also be mixed with a phenolic condensation product, preferably in a powdered form, after which the impregnated cork and the wood flour, mixed with the binder, may be placed in a suitable receptacle and mixed in desired proportions.

A molding composition formed in this manner may be applied to the circular rim of a steering-wheel frame and molded thereto by applying heat and pressure in a suitable mold. Gripping members may also be provided by molding a composition, such as described, to desired shapes which may then be secured to the steering wheel frame by any suitable fastening means, such as screws, suitable openings being provided in the gripping members to receive the fastening means.

In Fig. 1 is shown a portion of a steering wheel provided with gripping members formed in accordance with my invention. In this instance, the steering-wheel frame 1 is of one piece and carries a ring 2 upon which gripping members 3, are fastened. The gripping members 3, in this case, may be preformed to desirable shape to constitute separable sections which may be secured together about the ring 2. As shown in Fig. 2, the uppermost sections or parts 4 may be molded with metal inserts 5 tapped to receive screws 6. The lower parts or sections 7 of the gripping members 3 may be formed with openings 8 to permit passage of the screws 6 and are of such dimensions as to permit the screws 6 being countersunk.

Gripping members thus formed may comprise a plurality of molding compositions of such character that the upper sections 4 may be more highly finished or decorative in appearance than the lower sections 7 which may possess a higher coefficient of friction. However, if it is desirable that the gripping members possess a high coefficient of friction throughout their entire surfaces, the upper and lower sections may both be constructed of the same molding composition.

In any event, the three ingredients, namely cork, wood flour and phenolic condensation product are employed. If it is desired that the upper portions have a higher finish, the wood flour predominates, and if it is desired that a high coefficient of friction be obtained, a greater percentage of cork is employed. It has been found, by extensive tests, that desirable proportions of material may be had by employing from 25% to 50% ground cork and the remainder wood flour.

The separable sections 4 and 7, as shown in Fig. 2, may be constructed by impregnating the cork and mixing it with wood flour which has also been mixed with a phenolic condensation product and the composition may be disposed in a suitable mold, along with the metal inserts 5 provided in the sections 4, and there subjected to heat and pressure to compact it and harden the binder, channels being provided in the sections, by molding or otherwise, to receive the ring 2. The formed sections 4 and 7 may be disposed on opposite sides of the ring 2 and the screws 6 may then be threaded into place to secure the sections together.

A gripping member may also be provided, by my invention, for a steering wheel as shown in Fig. 5. In this instance, a molding composition may be positioned about the rim 9 of a steering wheel 10 and the rim, with its surrounding composition, may be placed in a mold and there subjected to heat and pressure, whereby the composition is strongly bound to the metallic rim. In this figure, a slightly different type of frame is shown to illustrate a further advantage of the gripping members provided by my invention. In this case. the frame 10 is composed of separable sections, each section forming substantially a quadrant, which, when secured together by suitable means, such as screws, constitute a wheel. The molding composition, being molded directly upon the rim and, in this instance, upon adjacent portions of the frame, serves not only to furnish means whereby the wheel may be operated but also to supplement the fastening means whereby the separable frame sections are secured together.

The molding composition may be varied, in this case, in substantially the same manner as that in which the gripping members are constructed as separable preformed parts. This may be accomplished by concentrating the cork in that part of the composition surrounding the rim of the wheel which will be least exposed to view, while the remainder of the composition may comprise a higher percentage of wood flour and, in this manner, a decorative finish may be provided for the more visible parts.

When the steering wheel is to be applied to vehicles in which the appearance of the wheel is of minor importance, the gripping members are preferably constructed of a higher percentage of cork, so that a high coefficient of friction may be provided to thereby obtain a decided advantage. By my invention, I provide a composition for constructing gripping members. the qualities of which may be readily varied with great ease. However, the ultimate gripping members, regardless of the proportions of the ingredients employed. all have desirable qualities of durability, as well as of being unaffected by adverse atmospheric conditions.

Although I have described a plurality of steering wheels provided with gripping members in accordance with my invention, it is obvious, that, with minor changes in the proportions of the ingredients, various other applications may be found therefor, and I desire that no limitations shall be imposed except such as are indicated in the appended claims.

I claim as my invention:

1. A steering wheel comprising a metallic frame and gripping members adapted to be secured thereto, each of which consists of a plurality of molded compositions.

2. A steering wheel comprising a metallic frame, a plurality of gripping members of molded material, certain of which have metallic inserts, and means co-operating with the metallic inserts fastening the gripping members thereto.

3. A steering wheel comprising a metallic frame, a plurality of gripping members, formed of ground cork and wood flour impregnated with a phenolic condensation product and certain of which have metallic inserts spaced from each other, and means co-operating with the metallic inserts securing the gripping members to the frame.

4. A steering wheel comprising a metallic frame and two-part gripping members having tapped metallic inserts molded in one part of each member, whereby the members may be fastened to the frame by means of screws passed through openings provided in the other part of each member and threaded into the inserts.

5. A steering wheel comprising a metallic frame and two-part gripping members, composed of molded compositions, one of which has a higher coefficient of friction than the other, secured to the frame.

6. A steering wheel comprising a metallic frame and two-part gripping members composed of molded compositions containing cork, wood flour and a binder, one of said members having a higher percentage of cork than the other.

In testimony whereof, I have hereunto subscribed my name this 29th day of Nov., 1918.

J. STANLEY KINNEY.